United States Patent [19]
Mark et al.

[11] Patent Number: 5,682,241
[45] Date of Patent: Oct. 28, 1997

[54] METHOD AND APPARATUS FOR OVERCOMING CROSS-COUPLING IN A FIBER OPTIC GYROSCOPE EMPLOYING OVERMODULATION

[75] Inventors: John G. Mark, Pasadena; Daniel A. Tazartes; Amado Cordova, both of West Hills, all of Calif.

[73] Assignee: Litton Systems, Inc., Woodland Hills, Calif.

[21] Appl. No.: 613,558

[22] Filed: Mar. 11, 1996

[51] Int. Cl.$^6$ ............................................. G01C 19/72
[52] U.S. Cl. ............................................. 356/350
[58] Field of Search ............................ 356/350; 353/345

[56] References Cited

U.S. PATENT DOCUMENTS

| | | | |
|---|---|---|---|
| 5,189,488 | 2/1993 | Mark et al. | 356/350 |
| 5,289,257 | 2/1994 | Kurokawa et al. | 356/350 |
| 5,530,545 | 6/1996 | Pavlath | 356/350 |

*Primary Examiner*—Samuel A. Turner
*Attorney, Agent, or Firm*—Elliott N. Kramsky

[57] ABSTRACT

A phase modulator applies sequences of artificial phase shifts in the region of overmodulation between light beams counterpropagating within the sensor coil of a Sagnac interferometer to obtain improved random walk performance. The sequences are composed of phase shifts of $\pm a\pi/2b$ and $\pm(4b-a)\pi/2b$ where a is an odd integer and b is an integer greater than 1. The waveform for driving the phase modulator is derived from a $2\pi$ radian mapping plotted so that adjacent driving signal values differ by $a\pi/2b$ or $-(4b-a)\pi/2b$ in a first angular direction and by $-a\pi/2b$ or by $(4b-a)\pi/2b$ in the opposite angular direction. Angular transitions about the mapping may be predetermined to generate a deterministic, random, or pseudo-random modulation sequence. In the event that a deterministic sequence is chosen, it is examined for orthogonality properties to assume zero average output bias from crosstalk.

31 Claims, 8 Drawing Sheets

5,682,241

METHOD AND APPARATUS FOR OVERCOMING CROSS-COUPLING IN A FIBER OPTIC GYROSCOPE EMPLOYING OVERMODULATION

BACKGROUND

1. Field of the Invention

The present invention relates to fiber optic gyroscopes. More particularly, this invention pertains to apparatus and a method for overcoming the problem of bias due to electronic cross-coupling in a fiber optic gyroscope employing step overmodulation.

2. Description of the Prior Art

The Sagnac interferometer is an instrument for determining rotation by measurement of a nonreciprocal phase difference generated between a pair of counterpropagating light beams. It generally comprises a light source such as a laser, an optical waveguide consisting of several mirrors or a plurality of turns of optical fiber, a beamsplitter-combiner, a detector and a signal processor.

In an interferometer, the waves coming out of the beamsplitter counterpropagate along a single optical path. The waveguide is "reciprocal". That is, any distortion of the optical path affects the counterpropagating beams similarly, although the counterpropagating beams will not necessarily experience such perturbations at the same time or in the same direction. Time-varying perturbations may be observed where the time interval is equal to the propagation time of the light around the optical waveguide whereas "nonreciprocal" perturbations affect the counterpropagating beams differently and according to the direction of propagation. Such nonreciprocal perturbations are occasioned by physical effects that disrupt the symmetry of the optical medium through which the two beams propagate.

Two of the nonreciprocal effects are quite well known. The Faraday, or collinear magneto-optic effect, occurs when a magnetic field creates a preferential spin orientation of the electrons in an optical material whereas the Sagnac, or inertial relativistic effect, occurs when rotation of the interferometer with respect to an inertial frame breaks the symmetry of propagation time. The latter effect is employed as the principle of operation of the ring gyroscope.

The measured or detected output of a gyroscope is a "combined" beam (i.e., a composite beam formed of the two counterpropagating beams) after one complete traverse of the gyroscope loop. The rotation rate about the sensitive axis is proportional to the phase shift that occurs between the counterpropagating beams. Accordingly, accurate phase shift measurement is essential.

FIG. 1 is a graph of the well known relationship between the intensity (or power, a function of the square of the electric field) of the detected beam output from the coil of optical fiber and the phase difference that exists between the two counterpropagating beams after completion of a loop transit. The figure discloses an intensity that is proportional to the cosine of the phase difference, $\Delta\phi$, between the beams. Such phase difference provides a measure of the nonreciprocal perturbation due, for example, to rotation. A DC level is indicated on FIG. 1. Such DC level corresponds to the half (average) intensity level.

It is a well known consequence of the shape of the fringe pattern, that, when a small phase difference, or a small phase difference $\pm n\pi$ where n is an integer, is detected (corresponding to a relatively low rotation rate), the intensity of the output beam will be relatively insensitive to phase deviation or error as the measured phase difference will be located in the region of a maximum or minimum of the output fringe pattern. This phenomenon is illustrated at 10, 12, 12', 14 and 14' of the fringe pattern which correspond to phase shifts in the regions of $\phi=0,+\pi$, $-\pi$, $+2\pi$ and $-2\pi$ radians respectively. Further, mere intensity does not provide an indication of the sense or direction of the rotation rate.

For the foregoing reasons, a deliberately generated phase bias is commonly superimposed upon each of the counterpropagating beams, periodically retarding one and advancing the other in phase as the pair propagates through the sensor coil. The biasing of the phase shift, also known as "nonreciprocal null-shift", enhances the sensitivity of the intensity measurement to phase difference by shifting the operating point to a region characterized by greater sensitivity to a phase deviation $\epsilon$ indicative of the presence of rotation. In this way, the variation in light intensity observed at the photodetector, $\Delta I$ (or power $\Delta P$), is enhanced for a given nonreciprocal phase perturbation $\epsilon$.

By enhancing the intensity effect due to the presence of a given phase perturbation $\epsilon$, corresponding increases in photodetector output sensitivity to phase perturbations are obtained. These, in turn, may be translated into a simplification of the output electronics and improved accuracy. Such output electronics commonly includes a differencing circuit for comparing the intensity values of the operating points between which the electro-optic modulator (often a multifunction integrated optical chip or "MIOC") is cycled during a loop transit time $\tau$. Presently, fiber optic gyroscopes are commonly biased by a periodic modulation waveform, such as a square wave cycled between $+\pi/2$ with a period of $2\tau$ where $\tau$ is the transit time of light through the fiber coil.

Referring back to FIG. 1, the conventional square wave modulation corresponds to cycling of the output intensity curve between the operating points 16 and 16'. Each of the points 16 and 16' ($\pm\pi/2$ square wave modulation) lies at an inflection of the intensity fringe pattern where a small nonreciprocal perturbation $\epsilon$ of the phase difference $\Delta\phi$ results in a maximum, and essentially linear, detectable change, $\Delta I$ ($\Delta P$), in the optical intensity (power) output. Also, by alternating the bias imposed between two different operating points, the system can determine the sign of $\epsilon$ and, thus, the direction of rotation. (Alternately, the same result may be obtained by $\pm 3\pi/2$ modulation. This is indicated at the points 18 and 18' of the curve in FIG. 1.)

In addition to phase modulation, "phase-nulling" is commonly applied to the interferometer output. This introduces an additional phase shift through a negative feedback mechanism to compensate for that due to the nonreciprocal (Sagnac) effect. A phase ramp (either analog or digital) with slope proportional to the measured phase difference is commonly generated for this purpose. Commonly, a ramp, spanning a range of 0 to $2\pi$ radians, provides the nulling phase shift since the required shift cannot be increased indefinitely due to voltage constraints. A "resetting" of $2\pi$ is transparent to the gyro interferometer which operates on a modulo $2\pi$ basis as a result of the cosine function discussed previously.

One of the primary uses of inertial systems is to determine vehicle heading. Such a determination depends upon the quality of the system sensors, including the gyros, and is affected by the amount and type of noise in the gyro outputs. In particular, the ability of the gyroscope to accurately measure inertial angular rates is key to proper heading determination.

The noise properties of the outputs of advanced technology gyros (e.g., those of the laser and fiber optic type) include a statistical "angle random walk" characteristic. Angle random walk is caused by angular rate white noise (i.e., noise whose power spectral density (PSD) is "flat", that is, independent of frequency). Each observation of a variable (such as the angular rate output of a fiber optic gyro) contaminated by white noise is statistically independent from all others. The average of many such samples gradually converges to the true value. The uncertainty in the average measurement is inversely proportional to the square root of the averaging time. Thus, the uncertainty in an angular rate measurement is given by:

$$\sigma_\theta^\bullet = \frac{RW}{\sqrt{T}}$$

Where: $\sigma_\theta^\bullet$ is the standard deviation of the angular rate measurement;

RW is the random walk coefficient; and

T is the averaging time.

Typically, the initial heading accuracy of an inertial system depends on the accuracy to which the rotation rate of the Earth can be measured. Heading uncertainty is proportional to the angular rate measurement uncertainty given above. Since averaging times are typically short (usually 4 minutes), it is critical that the random walk coefficient be kept small. Furthermore, once heading has been acquired, drift in the integrated attitude angles degrades inertial system performance. An angle random walk process such as that discussed above leads to an angle error which grows statistically as the square root of time. Thus:

$$\sigma_\theta = RW\sqrt{T}$$

Where:

$\sigma_{74}$ is the standard deviation of the attitude error;

RW is the random walk coefficient; and

T is the operating time.

Once again, a low random walk coefficient is essential.

FIG. 2 is a graph (not to scale) that illustrates the relationship that exists between random walk (curve 20) and light source peak power in a fiber optic gyroscope. White noise in the output of a fiber optic gyro can have a number of sources. Electronics noise (both dark current and Johnson or thermal noise), shot noise, and beat, or synonymously relative intensity noise, may all contribute. The contribution of electronic noise to gyro random walk is inversely proportional to peak power. The contribution of shot noise to gyro random walk is inversely proportional to the square root of peak power. As may also be seen in that figure, the contribution of beat noise (curve 22) is independent of peak power and thereby limits the extent to which gyro random walk can be reduced through an increase. In contrast, within a predetermined range, increases in peak power will reduce the contributions of electronics noise (curve 24) and shot noise (curve 26). Beyond such range, increased power will not lead to better random walk performance.

The relative importance of beat noise increases with the power of the light source. Superluminescent diodes provide about 0.5 milliwatts of peak power whereas rare earth doped sources are commonly rated in the vicinity of 10 milliwatts. Referring to FIG. 2, the contribution of beat noise to random walk is a fraction of that of shot noise which, in turn, is a fraction of that of electronics noise when a low power source, such as a superluminescent diode, is employed. As the power of the light source is increased, the contribution of beat noise eventually dominates the noise performance of the gyroscope.

U.S. patent application Ser. No. 08/283,063 now U.S. Pat. No. 5,530,545 of George A. Pavlath entitled "Method For Reducing Random Walk in Fiber Optic Gyroscopes" addresses the foregoing problem. Such application, property of the Assignee herein, discloses a method that relies upon artificial overmodulation biasing of the beams that counter-propagate within the gyro sensor coil. It is taught, for example, that by biasing the gyro output curve of FIG. 1 between the points 28 and 28' rather than between the conventional ±π/2 operating points 16 and 16', or, alternatively, between the ±3π/2 operating points 18 and 18'), the contribution of beat noise (or synonymously relative intensity noise) to random walk will be reduced with increasing light source power. By overcoming the formerly-limiting effect of this noise source upon random walk reduction, the usefulness of high power sources is enhanced.

Both single axis and multiple axis gyroscope configurations are subject to bias errors arising from system crosstalk. For example, parasitic signals from the output digital-to-analog converter and from the driver amplifier of the gyro control loop can couple into the synchronous demodulator input. In addition, in a triaxial arrangement, such cross-coupling can take place between the digital-to-analog converters and driver amplifiers of one axis-measuring gyroscope and the synchronous demodulators of the gyros for measuring the other axes. Furthermore, in the event that a triaxial arrangement is simplified to operate with a single detector, the composite output may be subject to crosstalk between the outputs of the other axes.

Crosstalk represents a particular problem in the presence of stepped modulation of either the conventional (maximum sensitivity) or overmodulation type. When one employs a stepped modulation waveform such as a square wave, the resultant demodulation function is a copy of the modulation function. This subjects the gyro output to a net bias value when electrical leakage or cross-coupling takes place between the signal for driving the phase modulator and the input to the demodulator.

Spahlinger has proposed a solution to the crosstalk problem in U.S. Pat. No. 5,123,741 covering "Fiber Optic Sagnac Interferometer With Digital Phase Ramp Resetting via Correction-Free Demodulator Control" that relies upon the design of waveforms for driving the gyro phase modulator that incorporate random or correction-free component sequences. While addressing the issue of crosstalk, the method of that patent relies upon conventional, maximum sensitivity (i.e. ±π/2, ±3π/2) modulation and is therefore incapable of attaining the advantages offered by overmodulation techniques.

Another patent of the Assignee herein, U.S. Ser. No. 5,189,488 of Mark et al. entitled "Fiber Optic Gyroscope Utilizing Orthogonal Sequences" teaches the selection of deterministic modulation sequences with regard to the character of related primary and secondary demodulation sequences to overcome electronic cross-talk in a fiber optic gyroscope. The technique taught therein is again limited to conventional modulation schemes. Each of the above techniques is premised upon and assumes the use of conventional modulation waveforms (i.e. limited to ±π/2, ±3π/2 modulation). Neither addresses the problem of cross-talk in the context of overmodulation. As such, these techniques pertain to systems of inherently-limited random walk reduction capabilities.

SUMMARY OF THE INVENTION

The present invention addresses the preceding and other shortcomings of the prior art by providing, in a first aspect, a method for measuring rotation rate with a Sagnac interferometer of the type that includes a light source, a coupler for generating a pair of light beams from the output from said source, directing said beams into opposite ends of a sensor coil to counterpropagate therein and recombining said beams after transit through said coil to provide an output signal. A modulator is provided for imposing a series of artificial optical phase shifts upon the counterpropagating beams and a demodulator is provided for extracting rotation rate information from the output signal.

The method of invention involves driving the modulator to impose a sequence of artificial phase shifts upon the counterpropagating light beams. The duration of each phase shift is equal to the sensor coil transit time. The sequence of artificial phase shifts is selected from among phase shift values of $\pm a\pi/2b$ and $\pm(4b-a)\pi/2b$ where a is an odd integer and b is an integer greater than 1.

In a second aspect, the invention provides a method for generating a waveform for deriving the phase modulator of a Sagnac interferometer. Such method includes the step of deriving a modulo $2\pi$ mapping of values by (i) dividing the modulo $2\pi$ mapping into S segments, S being a whole number in accordance with:

$$S \times \theta = 2\pi N$$

where $\theta$ is $|a\pi/2b|$ and N is an integer; and (ii) assigning a value for driving the modulator to each of said segments so that each transition between adjacent mapping segments in a first angular direction corresponds to $a\pi/2b$ or $-(4b-a)\pi/2b$ and each transition between adjacent mapping segments in the opposite angular direction corresponds to $-a\pi/2b$ or $(4b-a)\pi/2b$.

The mapping is then traversed according to a predetermined sequence through all of the segments in a first direction and through all of the segments in the opposite direction to generate a stepped waveform.

Thereafter, primary and secondary demodulation sequences are generated that correspond to the stepped waveform. The primary and secondary demodulation sequences are compared in accordance with a predetermined criterion until demodulation sequences are generated such that the criterion is satisfied. Finally, the stepped waveform that corresponds to the demodulation sequence that satisfy the criterion is selected.

In a third aspect, the invention provides an improvement in a method for measuring rotation rate of the type in which a pair of light beams counterpropagates within a coil of optical fiber and are modulated by means of a series of artificial phase shifts imposed therebetween during each loop transit time. The improvement provided by the invention comprises selecting the phase shifts from among values of $\pm a\pi/2$ and $\pm(4b-a)\pi/2b$ where a is an odd integer and b is an integer greater than 1.

A fourth aspect of the invention provides an improvement in a Sagnac interferometer for measuring rotation rate about at least one axis of the type that includes a phase modulator. The phase modulator applies a sequence of optical phase shifts of duration equal to the sensor coil transit time to a pair of light beams counterpropagating within at least one sensor coil. Means are provided for combining and for demodulating at least one beam pair to determine rotation rate about at least one axis.

According to the invention, an improvement to a Sagnac interferometer of the aforesaid type comprises a generator for providing a bit sequence to the phase modulator for deriving a stepped waveform to impose a sequence of artificial phase shifts of $\pm a\pi/2b$ and $\pm(4b-a)2b$ where a is an odd integer and b is greater than 1.

In a fifth aspect, the invention provides a modulo $2\pi$ mapping for generating a stepped waveform to drive the phase modulator of a fiber optic gyroscope whereby phase shifts of $\pm a\pi/2$ and $\pm(4b-a)/2b$, where a is an odd integer greater than 1, are imposed upon beams counterpropagating within the gyro sensor coil. The mapping comprises a closed circle divided into S segments, each of which is associated with a value of the stepped waveform. S is a whole number such that $S \times \theta = 2\pi N$ where $\theta$ is $|a\pi/2b|$ and N is an integer. Values are assigned to the segments of the mapping so that each transition between adjacent segments in a first angular direction is equal to a step of $a\pi/2b$ or $-(4b-a)\pi/2b$ and each transition between adjacent segments in the opposite angular direction is equal to a step of $-a\pi/2b$ or $(4b-a)\pi/2b$.

The foregoing and other features and advantages of the present invention will become further apparent from the detailed description that follows. Such description is accompanied by a set of drawing figures. Numerals of the drawing figures, corresponding to those of the written text, refer to features of the invention. Like numerals refer to like features throughout both the written description and drawing figures.

DETAILED DESCRIPTION OF THE PREFERRED EMBODIMENT

The present invention is directed to the problem of cross-talk in fiber optic gyros that employ modulation sequences of the stepped type. Such sequences are beneficial insofar as they result in reduction of the random walk content of the gyro output beyond the "floor" that is observed when modulation waveforms for maximum detection sensitivity ($\pm\pi/2, \pm 3\pi/2$) are employed. In the invention, overmodulation waveforms of the stepped type, both random and deterministic, are chosen for application to the opto-electronic phase modulator of the gyro that offer the advantage, in gyro outputs, of overmodulation with elimination or substantial reduction of crosstalk. Overmodulation waveforms in accordance with the invention are substantially decorrelated from the resultant demodulation sequences. This effectively makes the gyro immune from bias due to modulation signal leakage.

The present invention provides a method for generating mappings that may be traversed according to predetermined or random patterns to generate candidate overmodulation waveforms of the stepped type. The patterns of traversal are then checked to assure that necessary conditions for decorrelation, discussed below, are satisfied. Thereafter, dependent upon the nature (i.e. deterministic or random) of the modulation waveform, sufficiency conditions are examined. The diagram may be traversed in either a random, pseudo-random or deterministic manner. In the event that the modulation sequence is random or pseudo-random, output error cancellation occurs over time as taught by U.S. Pat. No. 5,123,741. On the other hand, only those deterministic overmodulation sequences that obtain output error cancellation within a reasonable time frame are employed. "Candidate" deterministic overmodulation sequences are "screened" for orthogonality properties as taught by U.S. Pat. No. 5,189,488. Thus, the invention teaches modulation sequences for artificially biasing the phase difference between light beams counterpropagating within a gyro sensor coil that produce a gyro output characterized by (1) reduced random walk and (2) lessened sensitivity to the effects of unavoidable system crosstalk.

I. Overmodulation Sequence Generation

Figure 3:
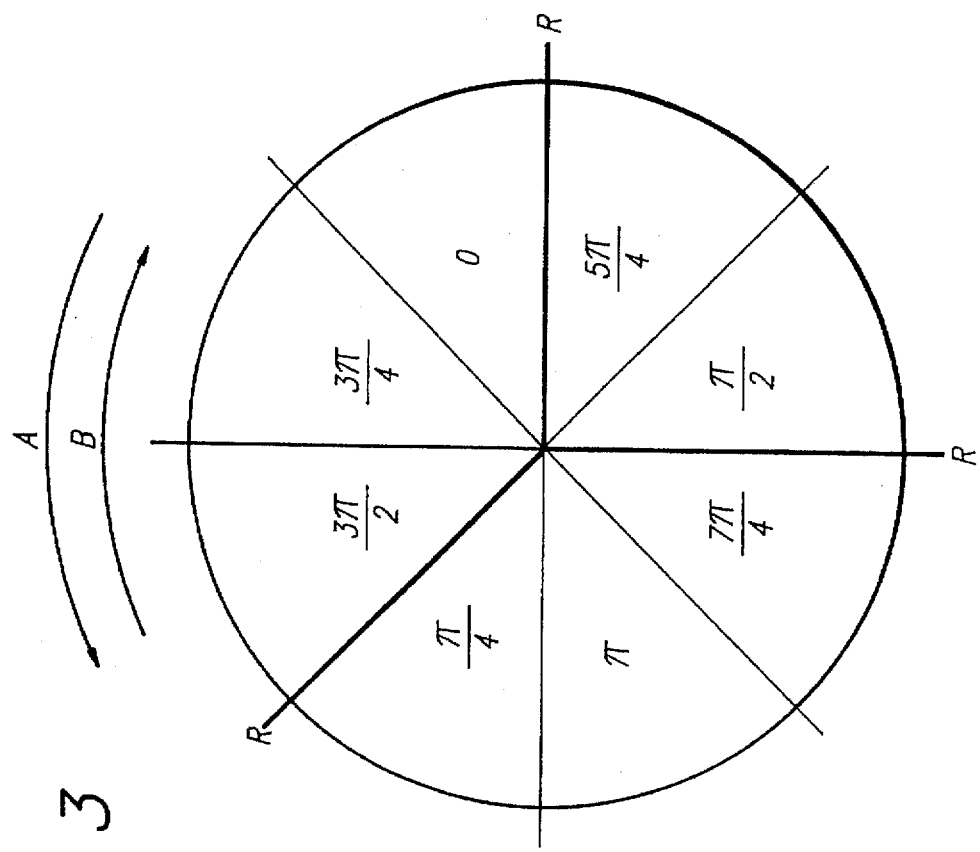
FIG. 3 is a mapping for generating waveforms for driving the phase modulator of a Sagnac interferometer in accordance with the invention.
Figure 2:
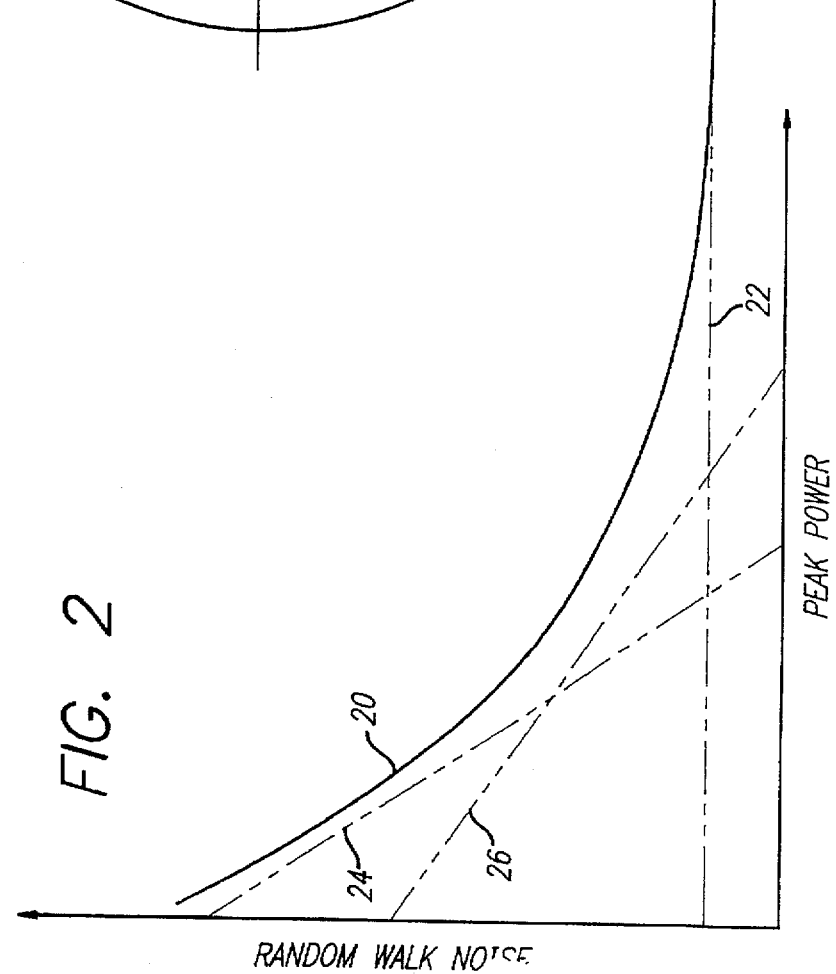
FIG. 2 is a graph of the relationship between the random noise components of the output of a fiber optic gyro and light source peak power.

FIG. 3 is a modulo $2\pi$ mapping for generating waveforms to drive the phase modulator of a Sagnac interferometer in accordance with the invention. By employing a mapping in accordance with FIG. 3 and satisfying necessary conditions discussed below, one can readily derive waveforms of both random and deterministic origins for imposing artificial phase shifts in regions of overmodulation. Such modulation is known to provide an interferometer output signal of improved random walk character. Further, by employing only those deterministic waveforms that also satisfy sufficiency conditions, one may simultaneously address the significant issue of parasitic crosstalk in a gyro system.

Figure 1:
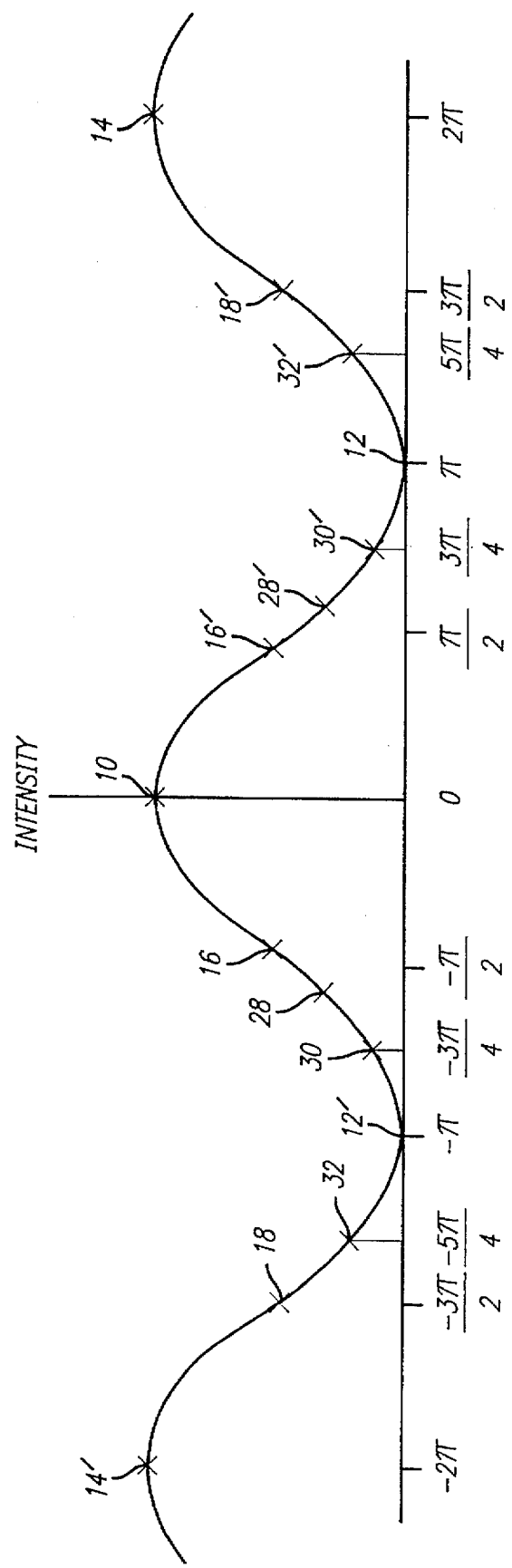
FIG. 1 is a graph of the intensity (or power) as a function of phase shift of the output of a fiber optic gyroscope for illustrating and contrasting conventional square wave modulation with regions of overmodulation.

Referring to FIG. 3, the mapping is arranged to introduce a sequence of artificial phase shifts of $\pm 3\pi/4$ and $\pm 5\pi/4$. Each discrete phase shift is equal in duration to a single loop transit time $\tau$. Cross-referencing the diagram of FIG. 3 to the gyro output diagram of FIG. 1, the overmodulation sequences to be generated involve "switching" between the points indicated at 30, 30' and 32, 32' of the gyro output curve.

The mapping of FIG. 3 comprises a closed circle that is divided into eight (8) segments. The mapping of FIG. 3 is arranged to generate stepped waveforms for driving a phase modulator to impose optical phase shifts of $\pm 3\pi/4$ and $\pm 5\pi/4$ between light beams counterpropagating within the sensor coil. Discrete values for generating overmodulation waveforms of the stepped type are marked within each of the segments. The mapping of FIG. 3 is arranged thusly: each counterclockwise (direction "A") transition about the mapping from one segment to the adjacent segment affects a numerical difference of $+3\pi/4$ or $-5\pi/4$ while each such clockwise transition (direction "B") affects a numerical difference of either $-3\pi/4$ or $+5\pi/4$. Physically, the differences, or steps, between adjacent segments correspond to phase shifts imposed by changes in the values of the stepped overmodulation waveform. Each transition occurs after a complete loop transit time $\tau$.

Traversing the segments of the mapping counterclockwise (i.e. direction A), overmodulation waveform values of 0, $3\pi/4$, $3\pi/2$, $\pi/4$, $\pi$, $7\pi/4$, $\pi/2$, and $5\pi/4$ are sequentially generated with the final state first wrapping around or undergoing a transition to the first. Bold lines marked "R" radiate from the center of the mapping at transitions of $\pm 5\pi/4$ and correspond to modulo $2\pi$ rollovers of the modulation waveform.

Prior to employing the representative mapping of FIG. 3 to generate a stepped waveform for generating optical phase shifts, it should be noted that the mapping of FIG. 3 may be generalized to include drive waveforms that are not limited to the voltage steps of $\pm 3\pi/4$ and $\pm 5\pi/4$. The generation of stepped overmodulation waveforms by means of like mappings follows from the following relationship:

$$S \times \theta = 2\pi N \qquad (1)$$

In the preceding equation, $\theta$ represents the size of a phase shift in the region of overmodulation in radians, N is an integer and S represents the smallest number of segments of a mapping required to generate an overmodulation waveform. Only those phase shifts that yield a solution to equation 1 are appropriate for generation of a mapping and, hence, for derivation of an appropriate overmodulation waveform. When a candidate phase shift $\pm a\pi/2$ is examined and found to yield a solution to the above equation, the resultant modulation waveform will comprise phase shift steps of $\pm a\pi/2$ and phase shift rollover values of $\pm(4b-a)\pi/2b$. The sum of the absolute values of the phase shift and rollover for any given solution to equation 1 is $2\pi$. Table I which follows summarizes the designs of mappings for different phase shift values based upon equation 1 above.

TABLE I

| Phase Shift | Rollover | Number of Segments |
|---|---|---|
| $\pm\pi/2$, | $\pm 3\pi/2$ | 4 |
| $\pm 3\pi/4$, | $\pm 5\pi/4$ | 8 |
| $\pm 5\pi/8$, | $\pm 11\pi/8$ | 16 |
| $\pm 7\pi/8$, | $\pm 9\pi/8$ | 16 |
| $\pm 9\pi/16$, | $\pm 23\pi/16$ | 32 |
| $\pm 11\pi/16$, | $\pm 21\pi/16$ | 32 |
| $\pm 13\pi/16$, | $\pm 19\pi/16$ | 32 |
| $\pm 15\pi/16$, | $\pm 17\pi/16$ | 32 |
| $\pm 17\pi/32$, | $\pm 47\pi/32$ | 64 |

II. Signal De-correlation

Necessary Conditions

Candidate stepped overmodulation waveforms are derived from the mapping of FIG. 3 (or a like mapping derived in accordance with equation 1) by traversing it in a combination of clockwise (direction B) and counterclockwise (direction A) rotations. Each rotation involves the transition from one mapping segment to an adjacent segment. As previously noted, each transition from segment to segment (i.e. modulation voltage value to adjacent voltage value) represents a change in value equal to either an overmodulation phase shift or a rollover phase shift.

The type of overmodulation sequence, random, pseudo-random or deterministic, determines the manner in which counterclockwise rotations are mixed with clockwise rotations. For example, one might employ a random number generator and utilize a decision rule that associates a clockwise rotation with each even number generated and a counterclockwise rotation with each odd number generated. In contrast, deterministic sequences of clockwise and counterclockwise rotations about the relevant mapping are predetermined.

Sequences defining overmodulation waveforms generated as above must satisfy two conditions to qualify as candidates capable of achieving decorrelation from the gyro demodulator, and thus clear of cross-talk. As a first necessary condition, the number of clockwise transitions must equal the number of counterclockwise transitions over a sufficiently long period of time (i.e., on the order of 1 second). As a second necessary condition, every sector of the diagram in FIG. 3 must be transversed at least once in both clockwise and counterclockwise directions. As a further desirable condition, each sector should be transversed an equal number of times in each direction over a reasonable time interval (i.e., on the order of 1 second).

Figure 4A:
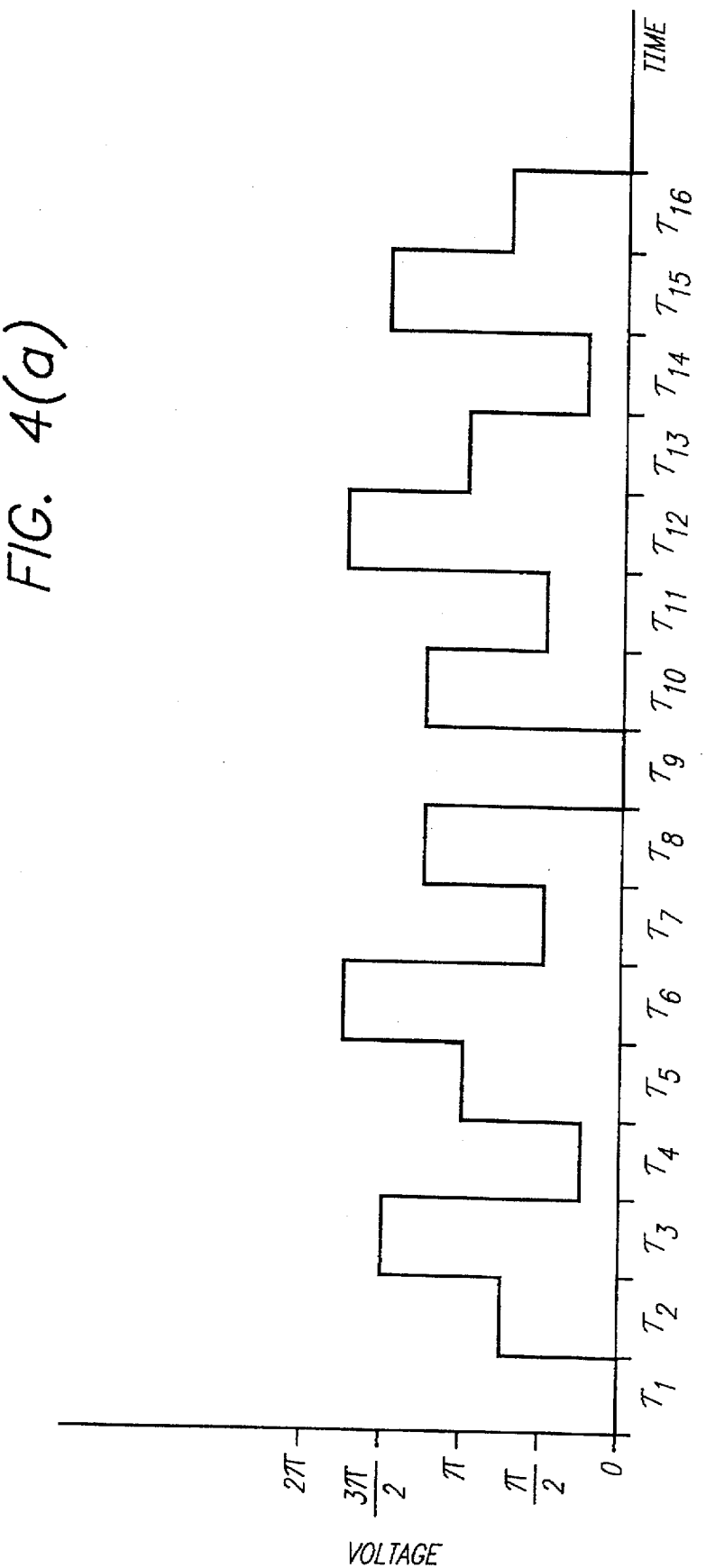
FIGS. 4(a) and 4(b) are waveforms that illustrate a signal for driving the phase modulator of an interferometer and the resultant sequence of artificial optical phase shifts thereby imposed upon light beams counterpropagating within a gyro sensor coil respectively.
Figure 4B:
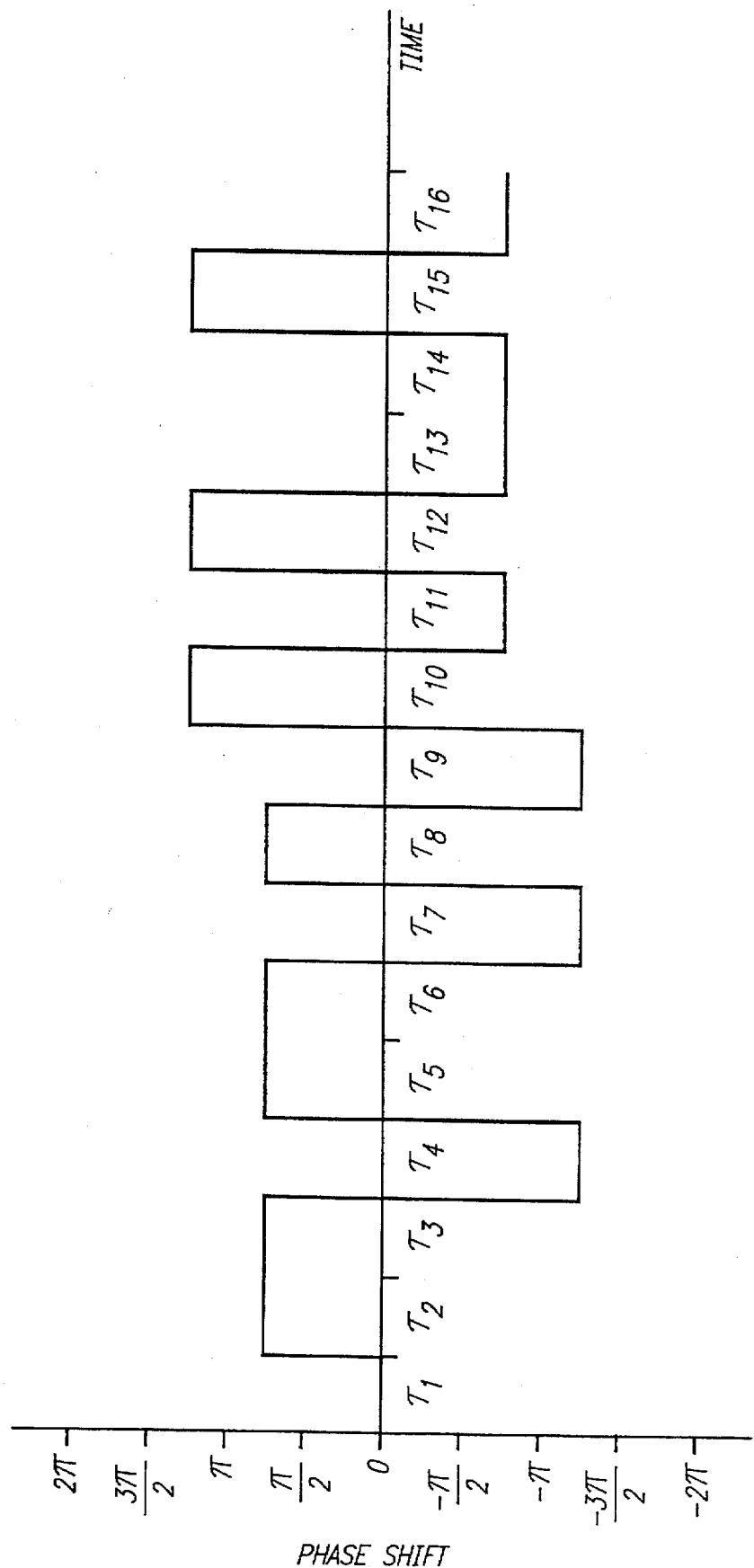

FIGS. 4(a) and 4(b) illustrate a waveform derived in accordance with the mapping of FIG. 3 for driving the phase modulator of a Sagnac interferometer and the resultant sequence of artificial optical phase shifts imposed respectively. The waveform of FIG. 4(a) comprises a stepped waveform for driving a phase modulator within the region of overmodulation. It comprises a series of $\pm 3\pi/4$, $\pm 5\pi/4$ voltage steps satisfying the two necessary conditions for decorrelation of modulation (and rate of change of modulation) from demodulation in a fiber optic gyro. The waveform is deterministic in nature, formed by first sweeping the mapping of FIG. 3 through a full rotation counterclockwise (direction A) and then clockwise (direction B). FIG. 4(b) is a diagram of the resultant artificial optical phase shifts imposed upon the light beams counterpropagating within the gyro sensor coil. While the deterministic scheme employed is quite simple, the example of FIGS. 4(a) and 4(b) is applicable to any other scheme of rotations about a mapping in accordance with FIG. 3 or an equivalent mapping based upon optical phase shifts of a different size.

Figure 5:
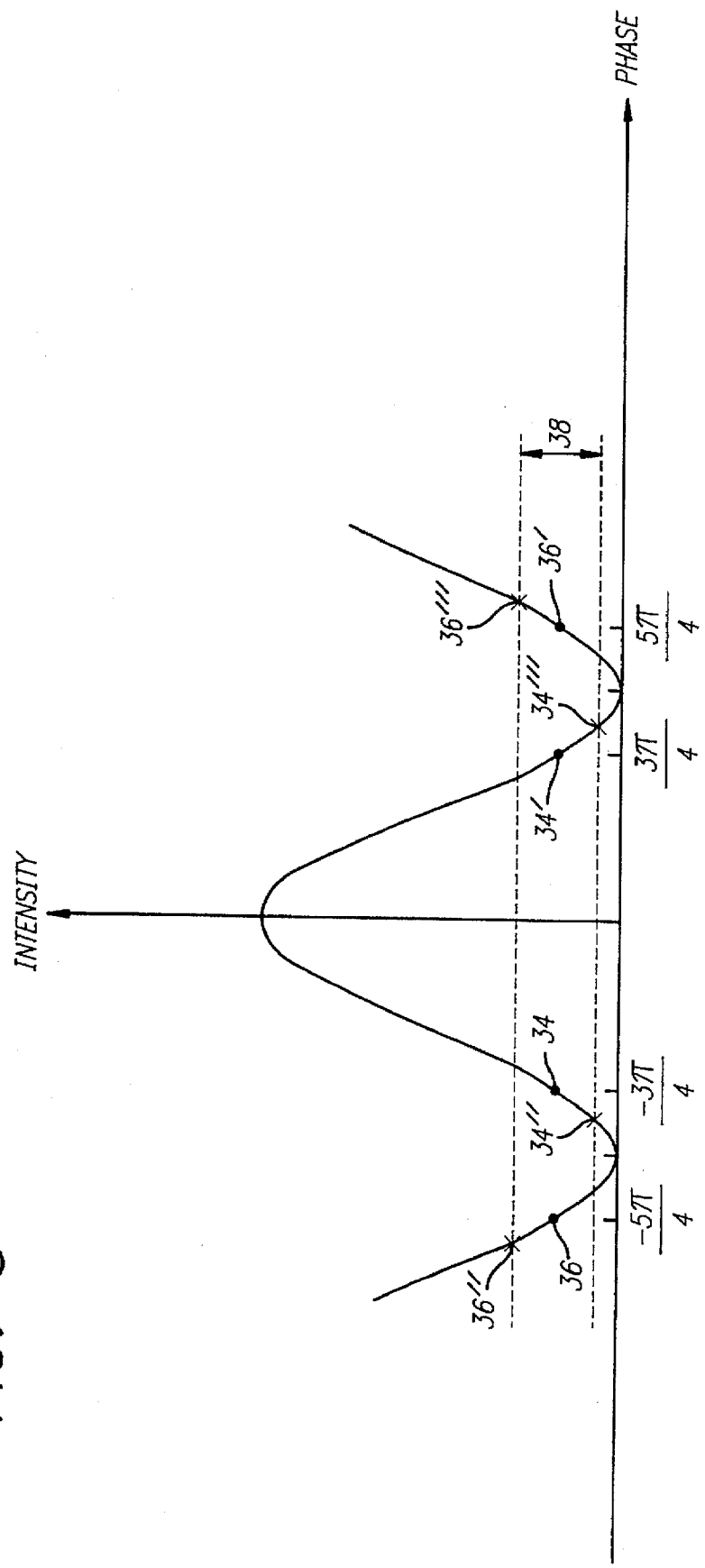
FIG. 5 is a graph of the intensity or power of the output of a fiber optic gyroscope as a function of phase shift for demonstrating the correction of scale factor error implicit in sequences of artificial phase shifts generated in accordance with the invention.

As can be seen, the series of artificial phase shifts imposed (FIG. 4(b)) consists of five (5) phase shifts of $3\pi/4$ and of $-3\pi/4$ and three (3) phase shifts of $5\pi/4$ and of $-5\pi/4$. The method of the invention for generating stepped waveforms also provides automatic observation of phase modulation scale factor error. This process or result can be observed in FIG. 5, a diagram of gyro output with the $\pm 3\pi/4$ and $\pm 5\pi/4$ operating points shifted from 34, 34', 36, 36' to 34", 34'", 36" and 36'" respectively due to the presence of scale factor error (i.e., too much phase shift applied). As illustrated in FIG. 5, a split 38 between the $\pm 3\pi/4$ and $\pm 5\pi/4$ points is caused by scale factor error. This figure shows the results for the case where too much phase shift is applied. The shift reverses direction if too little phase shift is used (scale factor too low). By observing the shift 38, a control algorithm may be used to adjust the scale factor to the appropriate value (i.e., zero split). Furthermore, in the event of a scale factor error, it is noted that in the case where there are five $3\pi/4$ transitions for every three $5\pi/4$ transitions as shown in FIG. 4b, the net error observed in the gyro output is zero, i.e., $-5\times(3\pi/4)+3\times(5\pi/4)-3\times(5\pi/4)+5\times(3\pi/4)=0$. The proper weighting of the $3\pi/4$ and $5\pi/4$ transitions in a 5:3 ratio is therefore an essential condition. More generally, the $\pm a\pi/2$ and $\pm(4b-a)\pi/2b$ transitions must be weighted in the ratio of $(4b-a):a$.

III. Demodulation

Random (Pseudo-random) Sequences

Once the two necessary conditions have been satisfied for a random or a pseudo-random sequence generated in accordance with the invention, de-correlation of the modulation signal and of the rate of change of the modulation signal with time (equal to the induced optical phase shift) with respect to the demodulation sequence follows. Thus, in addition to the self-correction of scale factor error, randomly and pseudo-randomly generated signals of stepped overmodulation composition will produce gyro output signals substantially unaffected by the presence of crosstalk.

U.S. Pat. No. 5,123,741 teaches the use of a signal derived from a randomly-generated modulation signal as a demodulation signal that is statistically independent of parasitic signals. As in that invention, the generation of a random or pseudo-random stepped overmodulation waveform will substantially eliminate the rectification of crosstalk from the gyro output signal. While random sequences result in the elimination of crosstalk effects from the gyro output signal, pseudo-random waveforms, comprising repeating randomly-generated sequences of predetermined length, substantially reduce, but, in theory, do not totally eliminate crosstalk effects from gyro output.

IV. Demodulation

Orthogonal Sequences

In the present invention, the modulation waveform and the rate of change of the modulation waveform are de-correlated from demodulation sequences through the use of orthogonality. Two sequences $A_i$, $B_i$ are said to be orthogonal over "n" time periods if the sum of $A_iB_i$ over the n time intervals is identically zero. Such sequences are deterministic. Unlike random or pseudo-random sequences, pairs of sequences designed to be orthogonal will reliably have a mean zero value within a predictable number of time intervals. In contrast, sequences possessing a random character can include correlated subsequences of unpredictable lengths. This feature of orthogonal sequences permits the user to analyze data representative of a finite number of modulated transits of an optical coil.

Not all waveforms are useful for application to the phase modulation problem and the inventors have derived a series of selection rules based, in part, upon orthogonal demodulation sequences, for choosing appropriate waveforms that impose artificial phase differences upon the counterpropagating beams.

In the invention, an orthogonality criterion is employed as the sufficiency condition for selection of deterministic overmodulation sequences. Relating such criterion to the representative stepped waveform of FIG. 4(a), discussed above, and referring to the mapping of FIG. 3 from which it was derived, the evaluation of a deterministic overmodulation voltage waveform for orthogonality is as follows. A primary demodulation sequence is derived from a stepped waveform of the type shown in FIG. 4(a) by assigning values of +1 or −1 in accordance with the direction of segment-to-segment transition about the mapping of FIG. 3 (direction A being counterclockwise and direction B being clockwise) taken during waveform generation. Arbitrarily, the convention employed assigns +1 to each counterclockwise segment-to-adjacent segment transition and −1 to each clockwise transition.

As mentioned earlier, the waveform of FIG. 4(a) is generated from the mapping of FIG. 3 by first taking eight (8) counterclockwise steps from the "0" voltage segment followed by another eight (8) consecutive clockwise transitions. As discussed earlier, this deterministic scheme satisfies the two necessary conditions for generating a driving waveform in accordance with the invention. The primary demodulation sequence that follows from the foregoing is [+1, +1, +1, +1, +1, +1, +1, +1, −1, −1, −1, −1, −1, −1, −1, −1]. A secondary demodulation sequence also follows from the stepped voltage waveform of FIG. 4(a) that can also be derived from the mapping of FIG. 3. Such secondary demodulation sequence also comprises a series of +1 and −1 values derived from the mapping of FIG. 3.

A secondary or scale factor demodulation sequence is determined by assigning the value +1 to each instance in which a bold rollover axis of the mapping, marked R, is crossed during generation of a stepped waveform and −1 to all other rotational transitions. Referring again to the representative deterministic waveform of FIG. 4(a), the associated secondary demodulation sequence is [−1, −1, +1, −1, −1, +1, −1, +1, +1, −1, +1, −1, −1, +1, −1, −1]. Evaluating the decision rule for selecting a modulation sequence for a Sagnac interferometer that specifies that associated primary and secondary demodulation sequences must be orthogonal, one must multiply the preceding demodulation sequences on an element-by-element basis and then take the resultant sum. Multiplying yields −1, −1, +1, −1, −1, +1, −1, +1, −1, +1, −1, +1, +1, −1, +1, +1, the sum of which is 0. Thus, the stepped voltage waveform of FIG. 4(a) satisfies not only the necessary conditions for a deterministic overmodulation waveform in accordance with the invention but also satisfies the sufficient condition of its orthogonality of its associated primary and secondary demodulation sequences.

"Candidate" stepped waveforms derived as above are examined with respect to a number of criteria relating to output gyro output quality. In practice, the numerous candidate sequences of phase shifts may be input to a computer. As mentioned earlier, some selection rules (i.e., sufficient conditions) are unrelated to the resulting digital demodulation sequences while others look only to such sequences. The examination of modulation sequences in accordance with the invention can occur with respect to both types of criteria and in any order.

Referring first to demodulation, each stepped waveform is translated into primary and secondary demodulation sequences as discussed above. The primary and secondary demodulation sequence pairs are then multiplied on an element-by-element basis to determine orthogonality. The waveforms that do not yield orthogonal primary and secondary demodulation pairs are then disregarded. The surviving waveforms are then further analyzed as discussed below to eliminate unsuitable candidates.

As a second rule of selection, the total number of +aπ/2 (b≠1) and −(4b−a)π/2b values of the stepped waveform must equal the total number of −aπ/2b and +(4b−a)π/2b values. This is so because the slope of the tangent to the gyro output fringe pattern at +aπ/2 is the same as that at −(4b−a)π/2b while the slopes of the tangents at −aπ/2b and +(4b−a)π/2b are also equal. Since the derivative or slope of the fringe pattern of a gyro indicates rate error, the primary or rate demodulation examines the tangent or slope of the curve. Inequality between the number of points at a positive (or negative) and negative (or positive) slope demodulated will introduce a sensitivity to offsets in the intensity signal and could cause a false rate indication.

A final qualitative selection rule is that the ratio of the number of ±aπ/2b voltage values to ±(4b−a)π/2b voltage values should be (4b−a)/a. In the event that this condition or rule were not satisfied, an apparent average intensity level shift would occur as a function of scale factor error. Furthermore, the presence of an offset in the detector or preamplifier would perturb the measurement of scale factor error.

As mentioned, in addition to the above-referenced criteria for examination of candidate stepped waveforms, a number of rules relate to the implicit demodulation sequences. Such rules, applying to both single axis and multiple gyro systems are set forth below:

1. The primary demodulation must be orthogonal to the secondary demodulation sequence. This rule, already mentioned, is required to assure that the rate error and scale factor error values will not corrupt each other. That is, the presence of scale factor error should not indicate rate and vice versa.
2. The digital representation of the stepped waveform and individual bits, their integrals and differentials, should be orthogonal to both the primary and secondary demodulation sequences.
3. The digital representation of waveform voltage changes and individual bit changes, their integrals and differentials, should be orthogonal to both the primary and secondary demodulation sequences.
4. For a single detector configuration, the primary demodulation of any gyro must be orthogonal to both the primary demodulation of any other gyro and to the secondary demodulation of any other gyro. Likewise, the secondary demodulation of any gyro must be orthogonal to the primary demodulation and the secondary demodulation of any other gyro. This represents an extension of the procedure discussed with reference to the selection of modulation sequences based upon the numerous requirements already discussed with reference to a single gyro system.
5. For a single detector configuration, the digital representation of voltage waveforms and individual bits of any gyro and their integrals and differentials should be orthogonal to the primary and secondary demodulation of any other gyro and the digital representation of waveform changes and individual bit changes of any gyro should be orthogonal to the primary demodulation and the secondary demodulation of any other gyro.
6. It is desirable that the sequence length should be of minimum length (preferably on the order of thirty-two gyro transit cycles or less) to insure sufficient loop controller bandwidth as such bandwidth is inversely proportional to sequence length.

Of the above-referenced rules, number 1 is absolutely required for a single axis system while number 4 is absolutely required for a multi-axis system using a single detector. Furthermore, rule number 1 must be satisfied for multiple axis systems employing multiple detectors. The other rules, while setting forth desirable conditions (such as eliminating bias due to crosstalk), are not absolutely required.

V. Gyro Configuration For Processing Overmodulation

Figure 6:
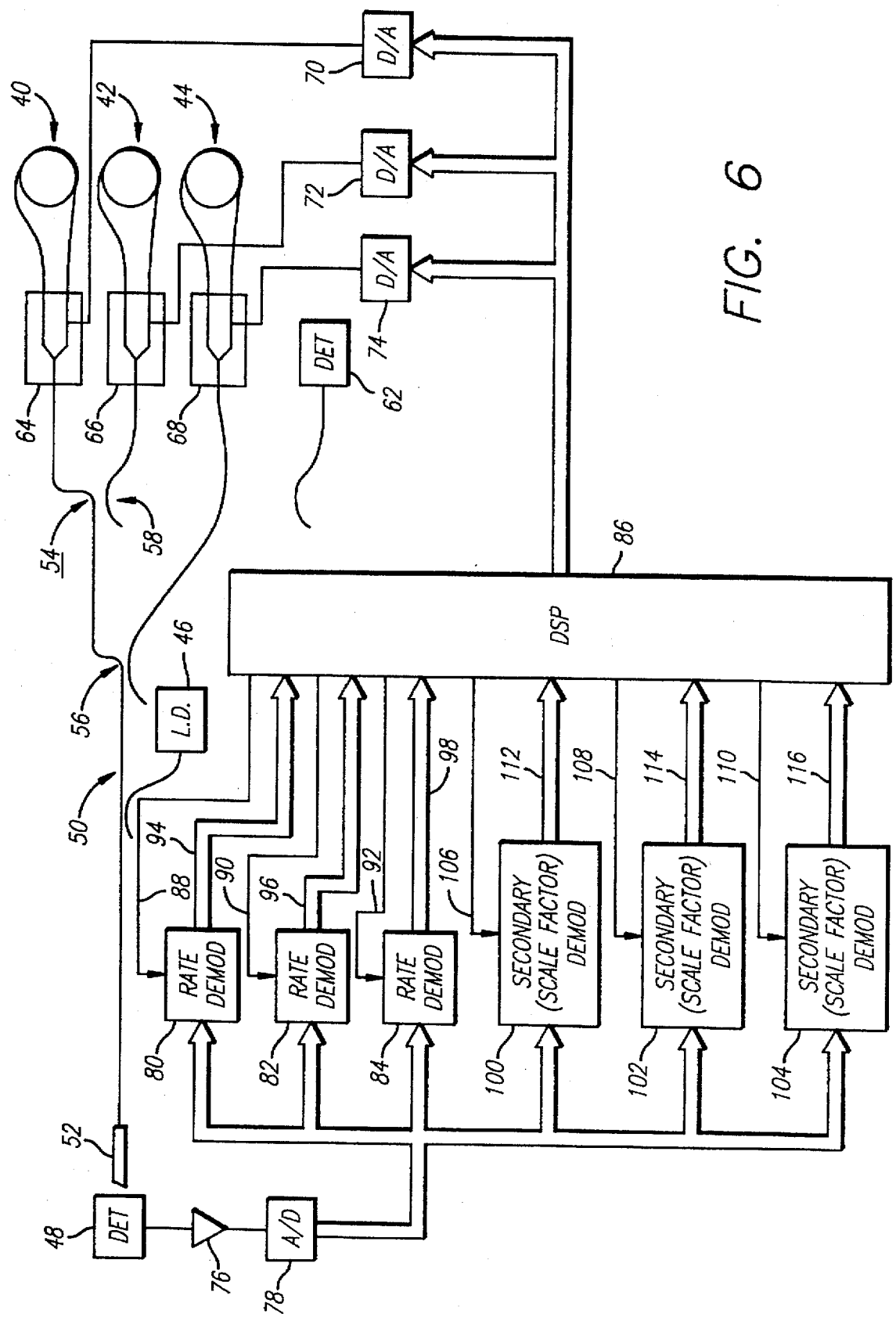
FIG. 6 is a block diagram of a triaxial fiber optic Sagnac interferometer configured to utilize modulation based upon orthogonal demodulation sequences.

FIG. 6 is a block diagram of a triaxial fiber optic Sagnac interferometer that is configured to utilize stepped waveforms for driving the gyro phase modulator. The arrangement of FIG. 6 is suitable for processing the outputs of optical coils 40, 42 and 44 in a system that utilizes a single source 46 and a single detector 48. It will be readily appreciated by those skilled in the art that the circuitry of FIG. 6 and the associated stepped overmodulation waveforms may be readily modified in accordance with the invention to provide corresponding advantages in other multiple gyro systems (e.g. two or four axes.)

Turning to FIG. 6, the laser diode source 46 provides energy via the wavelength division multiplexing fiber coupler 50 for pumping a rare earth-doped fiber 52 that is configured to act as both a source and an optical preamplifier.

The light emitted by the broadband fiber source 52 is applied to a splitter-combiner network 54 comprising a primary (50/50) coupler 56 and a pair of secondary (50/50) couplers 58 and 60 arranged as shown. The splitter-combiner network 54 acts to divide the incident light equally into four waves. Three of those four waves are delivered to the three optical coils 40, 42 and 44 for measuring rotation rates about three orthogonal axes. The fourth portion of the light energy is delivered to a monitor detector 62 that forms a portion of a circuit for stabilizing the output of the broadband fiber source preamplifier 52. Such a circuit is considered neither novel nor an essential feature of the present invention and thus is not illustrated in detail in FIG. 6.

Multifunction integrated optical chips 64, 66 and 68 are associated with the optical coils 40, 42 and 44 respectively. Each of such chips, comprising a substrate of electro-optically active material such as $LiNbO_3$ or $LiTaO_3$, with a y-junction waveguide deposited or diffused thereon and further including a polarizer, functions as both an interface between the splitter/combiner network 54 and the fiber optic coils 40, 42 and 44 serving to separate (and later combine) the incoming optical energy into two beams for counter-propagating within the coils and a phase modulator, applying artificial phase differences between the counterpropagating beam pairs. In the latter regard, it should be understood that each of the chips 64, 66 and 68 incorporates a phase modulation function for affecting the overmodulation sequences determined in accordance with the invention. This function is responsive to analog waveforms. Such waveforms are received from digital-to-analog converters, discussed below.

Each of the optical coils 40, 42 and 44 is modulated by a separate waveform that is selected, in part, in relation to (but independent of) the waveforms applied to the other two gyros as discussed above. Digital-to-analog converters 70, 72 and 74 provide analog electrical signals to the chips 64, 66 and 68 respectively for inducing the desired optical phase shifts.

The phase-modulated optical signal outputs of the gyros 40, 42 and 44 return through the splitter/combiner network 54 and are successively combined at the couplers 58 and 56. The combined signal is then transmitted through the wavelength division multiplexing fiber coupler 50 to the broadband fiber source 52 that now acts upon the incoming optical signal as an optical preamplifier. This combined signal is then applied to the common photodetector 48 wherein it is converted to a corresponding electrical current or voltage proportional to the optical intensity. The resulting electrical signal is applied to a preamplifier 76 and then applied to an analog-to-digital converter 78 to produce an amplified and digitized signal which is simultaneously transmitted to three digital rate demodulators 80, 82 and 84.

A digital signal processor 86 communicates with each of the rate demodulators 80, 82 and 84 and provides outputs for directing digital-to-analog converters 70, 72 and 74 to impose modulating waveforms to the modulators associated with the gyro coils 40, 42 and 44. Each of the rate demodulators 80, 82 and 84, while accepting the identical combined output signal, receives a unique primary or rate demodulation sequence from the signal processor 86 through the data paths 88, 90 and 92 respectively. In turn, the signal processor 86 receives the demodulated rate for each of the axes through the buses 94, 96 and 98. The output of each rate demodulator is the rate error signal for one of the orthogonal axes.

The demodulated rate signal is then processed by the signal processor 86 (or by parallel individual signal processors) to generate a ramp feedback signal. The ramp signal is added to the modulation sequence for that particular gyro to drive the rate error signal from the demodulator for that gyro to zero.

The digital signals provided by converter 48 are also provided to secondary demodulators 100, 102 and 104 associated with measurement of the phase modulator scale factor errors. Each of the demodulators 100, 102 and 104 also receives a unique secondary or scale factor demodulation sequence from the signal processor 56 through the data paths 106, 108, and 110 respectively. In turn, the signal processor 56 receives the demodulated scale factor data for each of the axes through the buses 112, 114 and 116. The output of each scale factor demodulator is the scale factor error signal for one of the orthogonal axes. The demodulated scale factor signal is then processed by the signal processor 86 (or by parallel individual signal processors) to generate a compensation for any residual scale factor error. Such compensation may be accomplished in one of many different ways. For example, the digital ramp signals generated using the outputs of the rate demodulators 80, 82, and 84 as well as the modulation and reset values can be multiplied by scale factors which compensate for the phase modulator sensitivity errors or variations. Alternatively, the reference voltages of the D/A converters 70, 72, and 74 can be adjusted so that the digital inputs to D/A converters 70, 72 and 74 generate analog voltages commensurate with the phase modulator sensitivities. While FIG. 6 shows rate and scale factor demodulators as separate blocks, it is possible to incorporate these functions directly within the signal processor 86 provided that this device has sufficient throughput.

Figure 7:
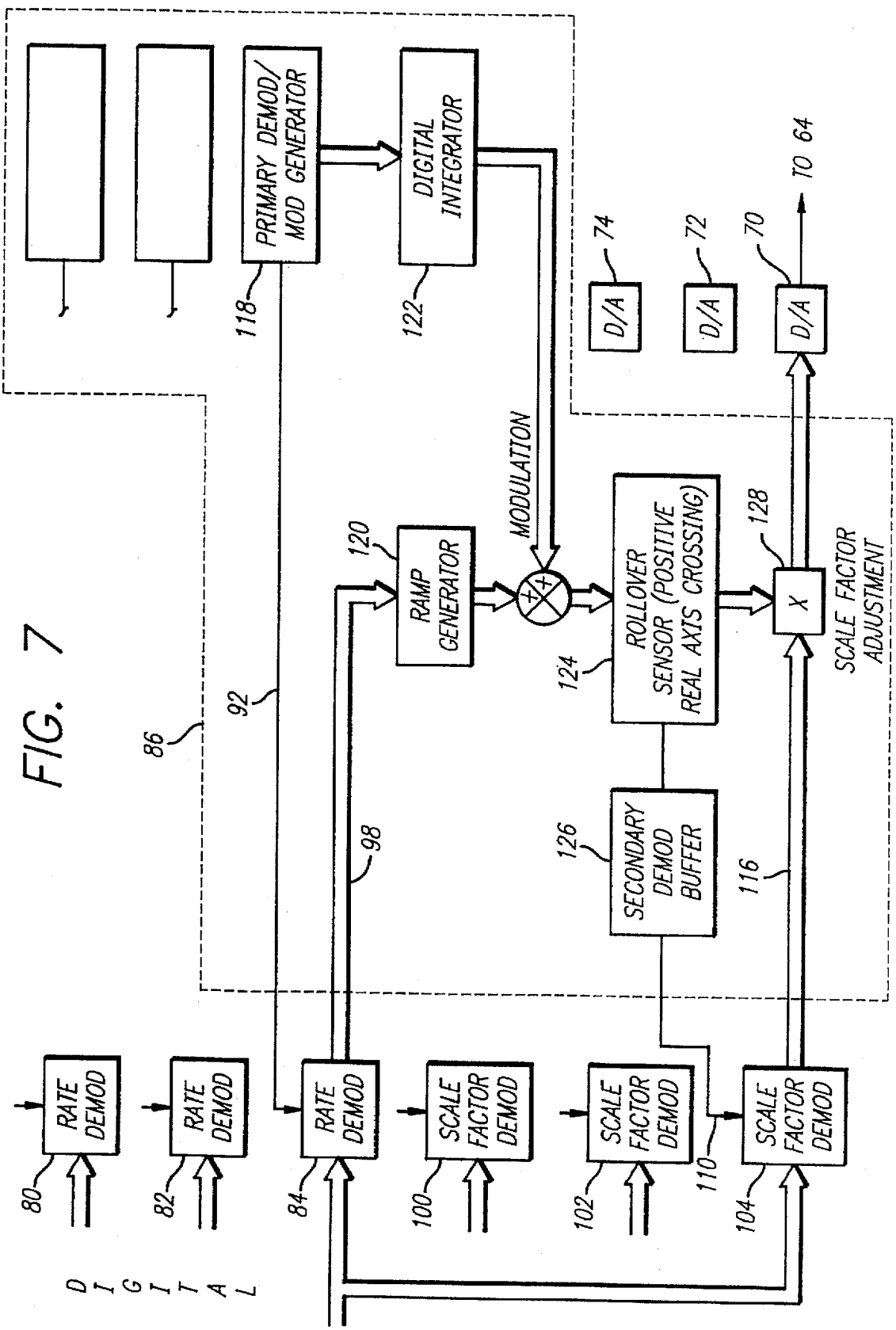
FIG. 7 is a functional block diagram for illustrating the implementation of the modulation processes of the invention.

FIG. 7 is a block diagram representation of the organization of the signal processor 86. The signal processor 86 provides a unique reference signal to each of the three rate demodulators 80, 82 and 84 and, in turn, accepts the output rate error signals of those demodulators. The rate error signals are then manipulated in accordance with the invention to derive feedback and modulation signals for driving the modulators 64, 66 and 68 during the next loop transit time.

The illustration and description with reference to FIG. 7 is somewhat simplified insofar as details of the operation of the signal processor are illustrated solely with respect to a single axis. However, from the preceding discussion it will be appreciated that the following discussion is applicable to the other axes with like processing involved. The only substantive difference between the processing of signals relating to the three axes derives from distinctions between the modulation (and, hence, demodulation) sequences "assigned" to each axis. As is apparent from the preceding discussion, the process for selecting demodulation sequences based upon a deterministically-derived stepped overmodulation waveform takes all axes into consideration in the case of a multi-axis system in applying the relevant selection rules. That is, demodulation sequences (and, therefore, the corresponding modulation sequences) are chosen as a group for a triaxial system utilizing a single detector 18 as shown in FIG. 6.

Referring to FIG. 7, the various signal processor functions are indicated within the outlined section 86. Focusing upon the gyro axis that is modulated by the output of the digital-to-analog converter 70, and whose output is demodulated at the rate demodulator 84, one can observe that the unique primary demodulation sequence for such axis is received from a primary demodulation/modulation generator 118 (one of three generators). Such sequence may be deterministic, random or pseudo-random. As mentioned above, the sequence received from the primary demodulation/modulation generator 118 is applied to the rate demodulator 84 to extract the rate error signal for the corresponding axis from the composite output signal received at the detector 48. In the event that deterministic overmodulation is employed, the generator 118 comprises a register for storing a preprogrammed sequence of +1 and −1 values. In the event that random overmodulation is employed, the generator 118 comprises a random number generator that provides a random sequence of +1's and −1's. Finally in the event of pseudo-random overmodulation, the generator 118 comprises a random number generator in combination with a register of predetermined bit length.

The rate error signal is applied to a ramp generator 120, producing a digital sequence that corresponds to the phase ramp of the gyro.

A digital integrator 122 first receives the digital primary demodulation sequence from the generator 118. The integrator 122 effectively "tracks" transitions dictated by the primary sequence about a mapping as shown in FIG. 3. As mentioned earlier, the transitions represented by the primary demodulation sequence relate the imposed artificial phase shifts to the digital demodulation sequence. The modulation is added to the digital ramp created by ramp generator 120 to provide a driving signal for the gyro phase modulator. However, in order to accommodate the limited drive voltage range available, it is necessary to rollover or reset the signal so that it covers a range of 2nπ.

A rollover sensor 124, which can be a digital comparator or which can directly result from proper scaling of the binary format digital data, is used to detect rollover transitions as illustrated in the mapping of FIG. 3. When a rollover transition is sensed, the secondary demodulation sequence of the axis under investigation is correspondingly saved as discussed above to produce the secondary demodulation sequence for that axis. A buffer 126 accepts the secondary demodulation sequence. The secondary demodulation is then applied to the secondary demodulator 104 which operates on the digital representation of the FOG output signal provided by A/D converter 78. The secondary demodulator 104 determines the scale factor error and compensates for it by means of the multiplier 128 which scales the digital output to the proper value to match the actual phase modulator scale factor (or sensitivity).

The output of the multiplier 128 comprises a digital representation of the combined modulation and ramp signals properly scaled to the gyro phase modulator sensitivity. The output of the multiplier 128 is then applied to the digital-to-analog converter 70 of the selected axis to drive the electro-optic modulator 64.

By employing the teachings of this invention with respect to the selection of stepped waveforms for driving the phase modulator of a fiber optic gyroscope, one may avail oneself of the advantages, in terms of lower random walk, of overmodulation without substantial bias. The effects of such crosstalk are eliminated in the event that either deterministic or random modulation schemes are employed in accordance with the invention while they are rendered negligible should pseudo-random overmodulation of a meaningful period be employed.

Figure 8:
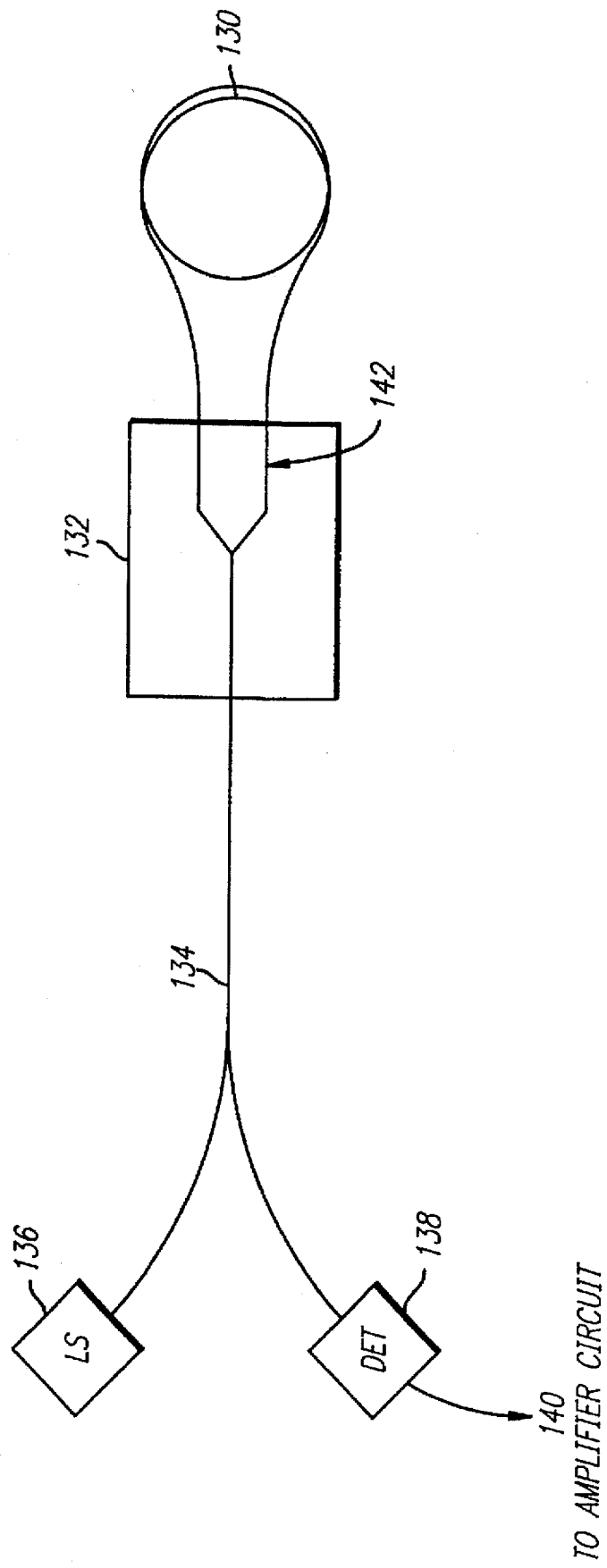
FIG. 8 is a simplified schematic diagram of a single axis fiber optic signal interferometer in accordance with the invention for minimum randum walk reference.

FIG. 8 is a simplified schematic diagram of a single axis Sagnac fiber optic interferometer in accordance with the invention for achieving minimum random walk performance. A fiber coil 130 is attached to an integrated optics chip 132 of the type previously referred to as elements 64, 66, and 68 with reference to FIG. 6. A y-junction 142 is incorporated into the integrated optics chip 142, separating incoming light into clockwise and counterclockwise directions of propagation. After recombination at the y-junction 142, the output beam is directed to a detector 138. (The base of the y-junction 142 is attached to a coupler 134, one branch of which is connected to a light source 136 and the other branch of which is connected to the detector 138. Thus, light launched from the source 136, which may be a semiconductor or fiber source, enters the fiber coil 130 via the coupler 134 and the y-junction 142 while light exiting the coil 130 is combined by the y-junction 142 and routed through coupler 134 to the detector 138.) The detector 138 converts the optical output to an electrical signal that is then applied, along a conductor 140, to an amplifier and A/D converter such as referred to as elements 76 and 78 of FIG. 6. Gyro modulation and control are performed through a single channel of an arrangement such as shown in FIG. 6 with a gyro drive signal generated by means of a D/A converter such as that referred to as element 70 of that figure. The drive signal controls the phase modulator of the integrated optics chip 132. Thus, with the exception that only a single rate and secondary demodulator is used per gyro axis, the teachings of FIGS. 6 and 7 apply to the single axis interferometer of FIG. 8.

While this invention has been described with reference to its presently preferred embodiment, it is not limited thereto. Rather, this invention is limited only insofar as defined by the following set of patent claims and includes within its scope all equivalents thereof.

What is claimed is:

1. A method for measuring rotation rate with a Sagnac interferometer of the type that includes a light source, a coupler for generating a pair of light beams from the output of said source, directing said beams into opposite ends of a sensor coil to counterpropagate therein and recombining said beams after transit through said coil to provide an output signal, a modulator for imposing a series of artificial optical phase shifts upon said counterpropagating beams and a demodulator for extracting rotation rate information from said output signal, said method comprising the steps of:

a) driving said modulator to impose a sequence of artificial phase shifts upon said counterpropagating light beams, the duration of each of said phase shifts being equal to the sensor coil transit time; and b) selecting said artificial shifts from values of $\pm a\pi/2b$ and $\pm(4b-a)\pi/2b$ where a is an odd integer and b is an integer greater than 1.

2. A method as defined in claim 1 wherein the step of selecting a sequence further comprises deriving a modulo $2\pi$ mapping of said values.

3. A method as defined in claim 2 wherein said step of deriving a modulo $2\pi$ mapping further comprises the steps of:

a) dividing said mapping into S segments, each of such segments being associated with a value of a stepped waveform for driving said phase modulator and S being a whole number in accordance with $$S \times \theta = 2\pi N$$

where $\theta$ is $|a\pi/2b|$ and N is an integer;

b) assigning said values to said segments so that (i) each transition between adjacent segments in a first angular direction is equal to a step of $a\pi/2b$ or $-(4b-a)\pi/2b$, each transition between adjacent mapping segments in the opposite angular direction is equal to a step of $-a\pi/2b$ or $(4b-a)\pi/2b$, and (ii) each value is no greater than $2\pi$; and c) marking each boundary between adjacent segments whose values decrease in said first angular direction by a rollover axis.

4. A method as defined in claim 3 further including the step of selecting said values for driving said modulator by:

a) traversing all segments of said mapping in a first direction; and b) traversing all segments of said mapping in the opposite direction.

5. A method as defined in claim 4 further including the step of deriving said stepped waveform by traversing said mapping in accordance with a pseudo-random sequence.

6. A method as defined in claim 4 further including the step of deriving said stepped waveform by traversing said mapping in accordance with a randomly generated sequence.

7. A method as defined in claim 4 including the step of deriving said stepped waveform by traversing said mapping in accordance with a deterministic sequence.

8. A method as defined in claim 7 further including the steps of:

a) generating primary and secondary demodulation sequences that correspond to a first stepped waveform; then b) comparing said primary and secondary demodulation sequences in accordance with a predetermined criterion; then c) repeating steps a and b with at least one further stepped waveform until demodulation sequences are generated such that said criterion is satisfied; and then d) selecting said stepped waveform that corresponds to the demodulation sequences that satisfy said criterion.

9. A method as defined in claim 8 wherein the step of generating a primary and a secondary demodulation sequence corresponding to a chosen sequence further includes the step of assigning +1 or −1 to predetermined transitions of said mapping.

10. A method as defined in claim 9 further characterized in that the step of deriving said primary sequence further includes the steps of:

a) assigning +1 to each counterclockwise transition of said mapping; and b) assigning −1 to each clockwise transition of said mapping.

11. A method as defined in claim 10 further characterized in that the step of deriving said secondary sequence further includes the steps of:

a) assigning a +1 value every time a transition crosses a rollover axis of said mapping; and b) assigning a −1 value every time a transition crosses an axis other than a rollover axis.

12. A method as defined in claim 11 wherein the step of comparing said demodulation sequences includes the steps of:

a) multiplying said sequences together on an element-by-element basis; and then b) summing said multiplication products.

13. A method as defined in claim 12 wherein the step of selecting further includes the step of selecting a sequence in which the sum of said multiplication products is equal to zero.

14. A method as defined in claim 13 further including the steps of:

a) multiplying each of said phase shifts by said primary demodulation sequence on an element-by-element basis; then b) summing said multiplication products; and then c) selecting a sequence in which the sum of said multiplication products is zero.

15. A method as defined in claim 14 further including the steps of:

a) multiplying each of said phase shifts by said secondary demodulation sequence on an element-by-element basis; then b) summing said multiplication products; and then c) selecting a sequence in which the sum of said multiplication products is zero.

16. A method as defined in claim 13 further including the steps of:

a) calculating the values of the transitions between consecutive phase shifts of said sequence; then b) multiplying each of said transitions by said primary demodulation sequence on an element-by-element basis; then c) summing said multiplication products; and then d) selecting a sequence in a which the sum of said multiplication products is zero.

17. A method for generating a waveform for driving the phase modulator of a Sagnac interferometer comprising the steps of:

a) deriving a modulo $2\pi$ mapping of values by (i) dividing said modulo $2\pi$ mapping into S segments, S being a whole number in accordance with $S \times \theta = 2\pi N$, where $\theta$ is $|a\pi/2b|$ and N is an integer; and (ii) assigning a value for driving said modulator to each of said segments so that each transition between adjacent mapping segments in a first angular direction is $a\pi/2b$ or $-(4b-a)\pi/2b$ and each transition between adjacent mapping segments in the opposite angular direction is $-a\pi/2b$ or $(4b-a)\pi/2b$; then b) traversing said mapping according to a predetermined sequence through all said segments in a first direction and through all said segments in the opposite direction to generate a stepped waveform; then c) generating primary and secondary demodulation sequences that correspond to said stepped waveform; then d) comparing said primary and secondary demodulation sequences in accordance with a predetermined criterion; then e) repeating step b until demodulation sequences are generated such that said criterion is satisfied; and then f) selecting said stepped waveform that corresponds to the demodulation sequences that satisfy said criterion.

18. A method as defined in claim 17 wherein said criterion is orthogonality of primary and secondary demodulation sequences with respect to one another.

19. In a method for measuring rotation rate of the type in which a pair of light beams counterpropagate within a coil of optical fiber and are modulated by means of a series of artificial phase shifts imposed therebetween during each loop transit time, the improvement comprising the step of selecting said phase shifts from among values of $\pm a\pi/2b$ and $\pm(4b-a)\pi/2b$ where a is an odd integer and b is an integer greater than 1.

20. A method as defined in claim 19 wherein the step of selecting said phase shifts further comprises the step of deriving a modulo $2\pi$ mapping of values for driving said modulator.

21. A method as defined in claim 20 wherein said step of deriving a modulo $2\pi$ radian mapping further comprises the steps of:

a) dividing said modulo $2\pi$ mapping into S segments, S being a whole number in accordance with $$S \times \theta = 2\pi N$$

where $\theta$ is $|a\pi/2b|$ and N is an integer; and b) assigning a value for driving said modulator to each of said segments so that each transition between adjacent mapping segments in a first angular direction corresponds to $a\pi/2b$ or $-(4b-a)\pi/2b$ and each transition between adjacent mapping segments in the opposite angular direction corresponds to a phase shift of $-a\pi/2b$ or $(4b-a)\pi/2b$.

22. A method as defined in claim 21 further including the step of selecting said values for driving said modulator by:

a) traversing said mapping through all said segments in a first angular direction; and b) traversing said mapping through all said segments in the opposite angular direction.

23. A method as defined in claim 22 further including the steps of deriving said stepped waveform by traversing said mapping in accordance with a pseudo-random sequence.

24. A method as defined in claim 22 further including the step of deriving said stepped waveform by traversing said mapping in accordance with a randomly generated sequence.

25. A method as defined in claim 22 including the step of deriving said stepped waveform by traversing said mapping in accordance with a deterministic sequence.

26. A method as defined in claim 25 further including the steps of:

a) generating primary and secondary demodulation sequences that correspond to said traversing of said mapping; then b) comparing said primary and secondary demodulation sequences in accordance with a predetermined criterion; then c) repeating steps a and b with at least one further stepped waveform until demodulation sequences are generated such that said criterion is satisfied; and then d) selecting said stepped waveform that corresponds to the demodulation sequences that satisfy said criterion.

27. In a Sagnac interferometer for measuring rotation rate about at least one axis of the type that includes a phase modulator for applying a sequence of optical phase shifts of duration equal to the sensor coil transit time to a pair of light beams counterpropagating within at least one sensor coil and means for combining and for demodulating said at least one beam pair to determine rotation rate about at least one axis, the improvement comprising a generator for providing a bit sequence to said phase modulator for deriving a stepped waveform to impose a sequence of artificial phase shifts of $\pm a\pi/2b$ and $\pm(4b-a)\pi/2b$ where a is an odd integer and b is an integer greater than 1.

28. A Sagnac interferometer as defined in claim 27 wherein said generator further includes a random number generator.

29. A modulo $2\pi$ mapping for generating a stepped waveform to drive the phase modulator of a fiber optic gyroscope whereby artificial phase shifts of $\pm a\pi/2b$ and $\pm(4b-a)/2b$, where a is an odd integer and b is an integer greater than 1, are imposed upon beams counterpropagating within the gyro sensor coil, comprising, in combination;

a) said mapping comprising a closed circle;

b) said circle being divided into S segments where each of said segments is associated with a value of said stepped waveform;

c) S being a whole number in accordance with $$S \times \theta = 2\pi N$$

where $\theta$ is $|a\pi/2b|$ and N is an integer; and d) said values of said segments being such that each transition between adjacent segments in a first angular direction is equal to a step of $a\pi/2b$ or $-(4b-a)\pi/2b$ and each transition between adjacent segments in the opposite angular direction is equal to a step of $-a\pi/2b$ or $(4b-a)\pi/2b$.

30. A modulo $2\pi$ mapping as defined in claim 29 further characterized in that none of said values exceeds $2\pi$.

31. A modulo $2\pi$ mapping as defined in claim 30 further including a rollover axis marking the boundary between adjacent segments whose values decrease in said first angular direction.

* * * * *